(12) United States Patent
Li

(10) Patent No.: US 7,251,059 B2
(45) Date of Patent: Jul. 31, 2007

(54) SYSTEM FOR DISTINGUISHING LINE PATTERNS FROM HALFTONE SCREENS IN IMAGE DATA

(75) Inventor: Xing Li, Webster, NY (US)

(73) Assignee: Xerox Corporation, Stamford, CT (US)

( * ) Notice: Subject to any disclaimer, the term of this patent is extended or adjusted under 35 U.S.C. 154(b) by 982 days.

(21) Appl. No.: 10/272,866

(22) Filed: Oct. 16, 2002

(65) Prior Publication Data

US 2004/0076328 A1    Apr. 22, 2004

(51) Int. Cl.
*G06K 15/00*    (2006.01)
*H04N 1/40*    (2006.01)

(52) U.S. Cl. .................. 358/2.1; 382/176; 382/173; 382/205; 382/224; 358/3.08; 358/3.21; 358/3.26; 358/533; 358/463; 358/3.2; 358/536; 358/462; 358/173; 358/205; 358/224

(58) Field of Classification Search ........ 382/176, 382/173, 205, 224; 358/2.1, 3.08, 3.21, 3.26, 358/533, 463, 3.2, 536, 462; 400/76
See application file for complete search history.

(56) References Cited

U.S. PATENT DOCUMENTS

| | | |
|---|---|---|
| 2,988,045 A | 6/1961 | Fisher |
| 3,899,607 A | 8/1975 | Miller et al. |
| 3,916,029 A | 10/1975 | Hildebolt |
| 3,922,353 A | 11/1975 | Bernotavicz |
| 4,006,266 A | 2/1977 | Bone et al. |
| 4,190,679 A | 2/1980 | Coffee et al. |
| 4,260,635 A | 4/1981 | Fisher |
| 4,273,788 A | 6/1981 | Bone et al. |
| 4,276,311 A | 6/1981 | Burrows et al. |
| 4,364,925 A | 12/1982 | Fisher |
| 4,401,681 A | 8/1983 | Dahle |
| 4,508,741 A | 4/1985 | Corbett et al. |
| 4,574,690 A | 3/1986 | Chiao et al. |
| 4,702,929 A | 10/1987 | Lehn et al. |
| 4,771,733 A | 9/1988 | Axelrod |
| 4,847,098 A | 7/1989 | Langler |
| 4,868,002 A | 9/1989 | Scaglione et al. |
| D303,728 S | 10/1989 | Spainier et al. |
| D305,950 S | 2/1990 | Spiel et al. |
| 4,921,714 A | 5/1990 | Matthews et al. |
| 5,026,572 A | 6/1991 | Neiberger |
| 5,047,231 A | 9/1991 | Spanier et al. |
| 5,186,124 A | 2/1993 | Woodford |
| 5,200,212 A | 4/1993 | Axelrod |
| 5,240,720 A | 8/1993 | Axelrod |
| 5,290,584 A | 3/1994 | Ray |
| 5,339,771 A | 8/1994 | Axelrod |
| 5,455,059 A | 10/1995 | McFeaters |
| 5,525,366 A | 6/1996 | Zukerman et al. |
| 5,635,237 A | 6/1997 | Greenberg et al. |
| 5,668,893 A | 9/1997 | Kanda et al. ............ 382/197 |
| 5,673,653 A | 10/1997 | Sherrill |
| 5,695,797 A | 12/1997 | Geromini et al. |

(Continued)

*Primary Examiner*—Twyler Lamb
*Assistant Examiner*—Quang N. Vo
(74) *Attorney, Agent, or Firm*—Robert Hutter

(57) ABSTRACT

In a system, such as in a digital copier, for classifying image data derived from an original image, the image data is classified by type. An algorithm is applied to the gray levels of pixels surrounding each pixel of interest. The algorithm determines whether a local maximum or minimum is part of an image of closely-spaced lines.

5 Claims, 2 Drawing Sheets

U.S. PATENT DOCUMENTS

| | | | |
|---|---|---|---|
| 5,987,171 A | 11/1999 | Wang | 382/173 |
| 6,117,477 A | 9/2000 | Paluch | |
| 6,226,402 B1 | 5/2001 | Katsuyama | 382/171 |
| 6,238,715 B1 | 5/2001 | Baikie | |
| 6,254,910 B1 | 7/2001 | Paluch | |
| 6,277,420 B1 | 8/2001 | Andersen | |
| 6,655,861 B2* | 12/2003 | Yamakawa | 400/76 |
| 7,031,515 B2* | 4/2006 | Fuchigami | 382/165 |

* cited by examiner

| $P_{0,0}$ | $P_{0,1}$ | $P_{0,2}$ |
|---|---|---|
| $P_{1,0}$ | $P_{1,1}$ | $P_{1,2}$ |
| $P_{2,0}$ | $P_{2,1}$ | $P_{2,2}$ |

…

SYSTEM FOR DISTINGUISHING LINE PATTERNS FROM HALFTONE SCREENS IN IMAGE DATA

TECHNICAL FIELD

The present invention relates to an image processing method and system. More particularly, the invention relates to classifying data from an original input image as a low-frequency halftone screen.

BACKGROUND

In digital reproduction of documents such as in the digital copier environment, a document is first optically scanned and converted to a gray scale image. In the case of color reproduction, the document may be converted to a gray scale image of several separations, such as the R, G and B separations.

In order to produce a hard copy of the scanned and digitized image, the image has to be further processed according to the requirements of the marking engine. For example, if the marking engine is capable of bi-level printing, then the image has to be rendered into a 1-bit bit map for printing. To preserve the appearance of a gray scale image in a binary output, often some digital halftoning process is used in which the multi-bit input image is screened with a periodic array. However, if the original image itself contains halftone screen, objectionable moire patterns may occur due to the interference between the original and the new screens. Also, while dot screen halftoning may be good for rendering continuous tone originals, it may degrade the quality of text and line drawings. Often a document contains different types of images.

In order to achieve optimal image quality in document reproduction, a system capable of automatically identifying different types of images on or within a scanned original image is needed. For example, if an image part is identified as halftone, then some kind of low-pass filtering may be applied prior to halftone screening so the gray scale appearance can be preserved without introducing moire patterns. For text area, some sharpness enhancement filter could be applied and other rendering techniques such as thresholding or error diffusion could be used.

In classifying images or portions of images for the most suitable processing for subsequent printing or other purposes, one specific source of error is the misclassification of areas including closely, regularly spaced lines as a dot halftone screen. This problem is especially acute if the spacing and frequency of the lines in the original image are comparable to the frequency and spacing of dots in a halftone screen to which the algorithm is sensitive. If such a "lined" area is incorrectly characterized as an area of a halftone screen, inappropriate image-processing algorithms may be applied to the area, yielding undesirable image artifacts in, for example, a digital copy of the image. It is therefore desirable to avoid mischaracterization of lined areas of an original image as areas of halftone screen.

DESCRIPTION OF THE PRIOR ART

U.S. Pat. Nos. 5,668,893; 5,987,171; and 6,226,402 disclose examples of systems for detecting lined areas in an original image.

SUMMARY OF THE INVENTION

According to one aspect of the present invention, there is provided a method of classifying image data, the image data relating to a set of pixels forming an image in two dimensions, each pixel having a gray level associated therewith. The method comprises, for a center pixel, entering gray levels associated with neighboring pixels into a first algorithm to yield a result, the neighboring pixels having a predetermined spatial relationship with the center pixel, the result being indicative of a likelihood that the center pixel is part of a line image. The first algorithm determines that each of a subset of the neighboring pixels which is radially symmetric around the center pixel differs in gray level from the gray level of the center pixel by less than a predetermined threshold amount.

As used herein, the term "local maximum" can refer to either a local maximum or a local minimum of gray levels, as gray levels can vary by convention: a higher gray-level number can mean a lighter or darker image, depending on the context, such as in printing or scanning. Also, the term "gray level" need not apply to monochrome images exclusively, but can apply to any color or combination of colors within an image.

DETAILED DESCRIPTION

Figures 1, 2:
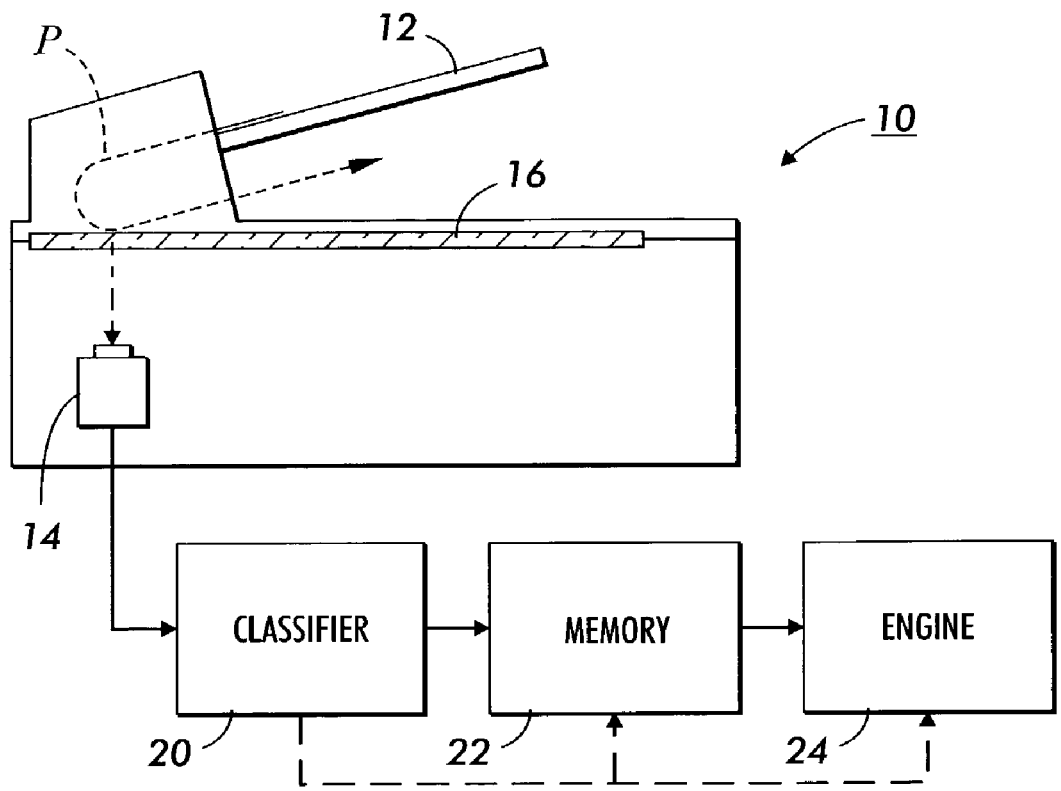
FIG. 1 is a diagram showing the elements of an input scanning and image processing system as would be used in a digital copier or other context.
FIG. 2 shows a convention for naming pixels neighboring a pixel of interest.

FIG. 1 is a diagram showing the elements of an input scanning and image processing system as would be used in a digital copier or other context. An input scanner generally indicated as 10, which is typically but not necessarily part of a larger device such as a digital copier or facsimile machine, draws sheets bearing original images to be scanned from an input tray 12 and moves the sheet through a process direction P relative to a photosensor chip (or assembly) 14, of a type well-known in the art, which converts reflected light from a series of small areas on the sheet into image data which is ultimately digitized. Alternately, a single sheet bearing an image can be placed on platen 16, and the chip 14 moves relative thereto to scan the image.

Downstream of the scanner 10 is what is here called a "classifier" 20, which is here separated out from other functions for sake of explanation, but which can in effect be part of a larger image-processing system. The function of classifier 20 is to take the raw image data from scanner 10 and classify the image data, or specific parts thereof, as, for example, text data, contone data (as would be derived, for instance, from a silver-halide photograph), or halftone-screen data. The classification of any portion of image data as text, contone, halftone, or any other relevant type is useful in subsequent processing of the data, such as in memory 22 or in a print engine such as 24 for making copies of the original image. Even if the image data is not subsequently printed, a correct classification is useful when, for example, image data in memory is attempted to be applied to an optical character recognition (OCR) or other pattern-recognition program (not shown), or if the image is desired to be sent by facsimile (not shown). Thus, the classification of some image data from classifier 20 can be sent downstream to the memory 22 or the control system governing the print engine 24.

An image-classification or "segmentation" algorithm such as used in the scanning context mentioned above typically scans the two-dimensional image input data (such as from a scanned hard-copy original image) to detect a regular, recurring pattern of what can be called "peaks and valleys," by which is meant closely-spaced alternating relatively light and dark areas within the image. A recognizable pattern of peaks and valleys found in a scanned original could be consistent with either a halftone screen or a set of closely-spaced lines. A purpose of the present embodiment to allow a classifier 20 to make the distinction between the two types of image.

Some of the basic conditions often used in qualifying a pixel as peak or a valley include 1) the gray level (darkness) of the pixel is the highest or lowest in the neighborhood and 2) the gray level difference between the pixel and the neighborhood average is greater than a certain threshold. However, many pixels in some slanted fine line regions could satisfy these conditions. The below algorithms are useful in reducing false characterization of peaks and valleys as a halftone screen if in fact the peaks and valleys are part of a set of closely-spaced lines.

The present embodiment makes the distinction first by considering the original image data as a series of 3×3 pixel windows, such as moving across a scan direction of the recorded image. For present purposes, each 3×3 window called be called a "neighborhood" or "context" around a center pixel. FIG. 2 is a diagram of such a context of pixels around a center pixel $P_{1,1}$.

According to the embodiment, an algorithm within classifier 20 looks at the gray levels in a neighborhood around a center pixel which has been preliminarily identified as a peak or valley (generally speaking, a "local maximum") and looks for patterns of relative gray levels consistent with a set of lines, as opposed to a dot screen. Such patterns to be detected are illustrated by the four possible patterns shown in FIG. 3. Basically the conditions require that the difference between any pixels labeled N and the pixel P should be small, or in other words lower than a predetermined threshold amount.

Figure 4:
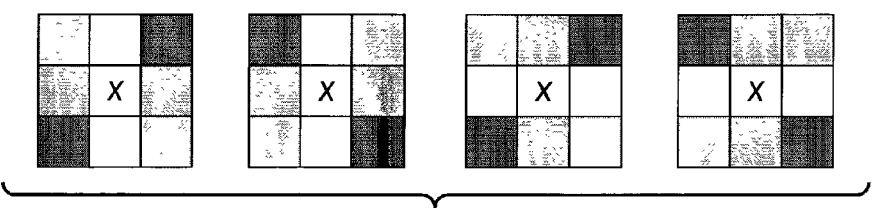
FIG. 4 is a set of four patterns of pixels neighboring a pixel of interest.

FIG. 4 shows a set of patterns for a second stage of tests on a center pixel with regard to a 3×3 neighborhood. The conditions require gray-level increase by a certain measure in a three pixel row (or column) along one direction on one side of the pixels labeled X (including the center pixel) and pixel gray-level increase in the row (or column) on the other side along the opposite direction.

Returning to the neighborhood pixel classification scheme shown in FIG. 2 above, the two types of tests for a line area can be summarized in the following algorithms. If any of the conditions in group A are met, AND any of the conditions in group B are met, then pixel $P_{1,1}$ will NOT be a peak or valley, and is therefore likely to be part of a lined image, and therefore any kind of image processing which is mainly intended to be applied to dot screen halftones would be inadvisable.

Group A:
1) $\max(\min(\text{abs}(P_{0,0}-P_{1,1}), \text{abs}(P_{1,1}-P_{0,1})), \min(\text{abs}(P_{1,1}-P_{2,1}), \text{abs}(P_{1,1}-P_{2,2}))) < \text{DIF1}$;
2) $\max(\min(\text{abs}(P_{0,2}-P_{1,1}), \text{abs}(P_{1,1}-P_{0,1})), \min(\text{abs}(P_{1,1}-P_{2,1}), \text{abs}(P_{1,1}-P_{2,0}))) < \text{DIF1}$;
3) $\max(\min(\text{abs}(P_{0,0}-P_{1,1}), \text{abs}(P_{1,1}-P_{1,0})), \min(\text{abs}(P_{1,1}-P_{1,2}), \text{abs}(P_{1,1}-P_{2,2}))) < \text{DIF1}$;
4) $\max(\min(\text{abs}(P_{0,2}-P_{1,1}), \text{abs}(P_{1,1}-P_{1,2})), \min(\text{abs}(P_{1,1}-P_{1,0}), \text{abs}(P_{1,1}-P_{2,0}))) < \text{DIF1}$;

Group B:
1) $\min((P_{0,0}-P_{1,0}), (P_{1,0}-P_{2,0}), (P_{2,2}-P_{1,2}), (P_{1,2}-P_{0,2})) > \text{DIF2}$;
2) $\min((P_{2,0}-P_{1,0}), (P_{1,0}-P_{0,0}), (P_{0,2}-P_{1,2}), (P_{1,2}-P_{2,2})) > \text{DIF2}$;
3) $\min((P_{0,0}-P_{0,1}), (P_{0,1}-P_{0,2}), (P_{2,2}-P_{2,1}), (P_{2,1}-P_{2,0})) > \text{DIF2}$;
4) $\min((P_{0,2}-P_{0,1}), (P_{0,1}-P_{0,0}), (P_{2,0}-P_{2,1}), (P_{2,1}-P_{2,2})) > \text{DIF2}$;

In the above logic, DIF1 and DIF2 are determined in the following way:

If the pixel has been detected as a peak, then DIF1=DIF1P; DIF2=DIF2P.

Else, if the pixel has been detected as a valley, then DIF1=DIF1V; DIF2=DIF2V.

DIF1P, DIF1V, DIF2P and DIF2V are programmable parameters.

Figure 3:
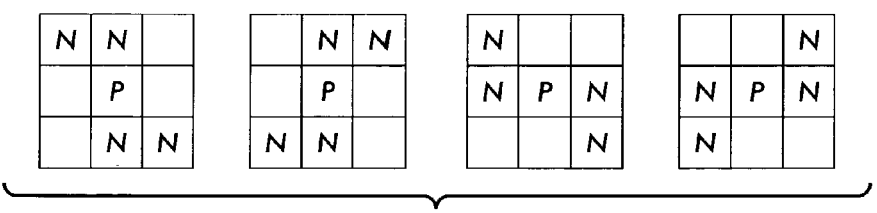
FIG. 3 is a set of four patterns of pixels neighboring a pixel of interest.

The group A conditions are illustrated in FIG. 3, and the group B conditions are illustrated in FIG. 4. To generalize the two types of conditions somewhat, it can be seen that, in the FIG. 3/Group A conditions, the test being determined is whether a certain subset of neighboring pixels N (in FIG. 3) around the center pixel P (which may have been determined to be a local maximum in a preliminary analysis) are as comparably "dark" as the center pixel. As can be seen in the variants within FIG. 3, in this embodiment the subsets of neighboring pixels N which are of interest correspond to subsets of neighboring pixels which form a pattern which is radially symmetric around the center pixel P. Certain of the subset of neighboring pixels which are of interest in each variant are in two of the four corner pixels of the array of neighboring pixels. Although a square 3×3 window of neighboring pixels are shown in the embodiment, other substantially square windows around a center pixel, such as a 5×5, 3×5, 7×5, etc., can be envisioned, with equivalent radially-symmetric arrangements of comparably dark neighboring pixels to be tested by an algorithm, can be envisioned. Also, in possible embodiments, the window of neighboring pixels does not need to be a contiguous set of pixels.

In the FIG. 4/group B conditions, it can be seen that the pattern being detected by the algorithm comprises, in a set of neighboring pixels in a row or column adjacent the center pixel P on one side thereof, an increase in dark level in pixels along one direction; for a set of neighboring pixels on the other side of the center pixel P, such as along a row or column, the pattern comprises a similar increase in dark level in the opposite direction. Once again, as with the FIG. 3 patterns, in possible alternate embodiments the window of neighboring pixels can be of any size and need not be a contiguous set of pixels.

In performing the algorithms relating to the group A and group B conditions, although the embodiment shows both algorithms being performed within a 3×3 window around a center pixel, either algorithm can be adapted to be carried out on any size window or other set of neighboring pixels in a predetermined spatial relationship to the center pixel; also it is not necessary that both algorithms be carried out on the same set of neighboring pixels relative to a center pixel.

The invention claimed is:
1. A method of classifying image data, the image data relating to a set of pixels forming an image in two dimensions, each pixel having a gray level associated therewith, comprising:
for a center pixel, entering gray levels associated with neighboring pixels into a first algorithm to yield a result, the neighboring pixels having a predetermined spatial relationship with the center pixel, the result being indicative of a likelihood that the center pixel is part of a line image;

wherein the first algorithm determines that each of a first subset of the neighboring pixels which is radially symmetric around the center pixel differs in gray level from the gray level of the center pixel by less than a predetermined threshold amount; and entering gray levels associated with a second set of neighboring pixels into a second algorithm, wherein the second algorithm determines that, for a second subset of neighboring pixels along one dimension relative to the center pixel, the gray levels of the pixels in the subset increase along the dimension in a first direction, and that, for a third subset of neighboring pixels along one dimension relative to the center pixel and on an opposite side of the center pixel as the second subset, the gray levels of the pixels in the third subset increase along the dimension in a second direction opposite the first direction.

2. The method of claim 1, further comprising determining that the center pixel is a local maximum.

3. The method of claim 1, wherein the neighboring pixels are arranged in a substantially square array around the center pixel.

4. The method of claim 3, wherein the first subset of neighboring pixels includes pixels in two corners of the substantially square array.

5. The method of claim 1, wherein each of the second subset of neighboring pixels and the third subset of neighboring pixels include at least three pixels.

* * * * *